Figure 1:
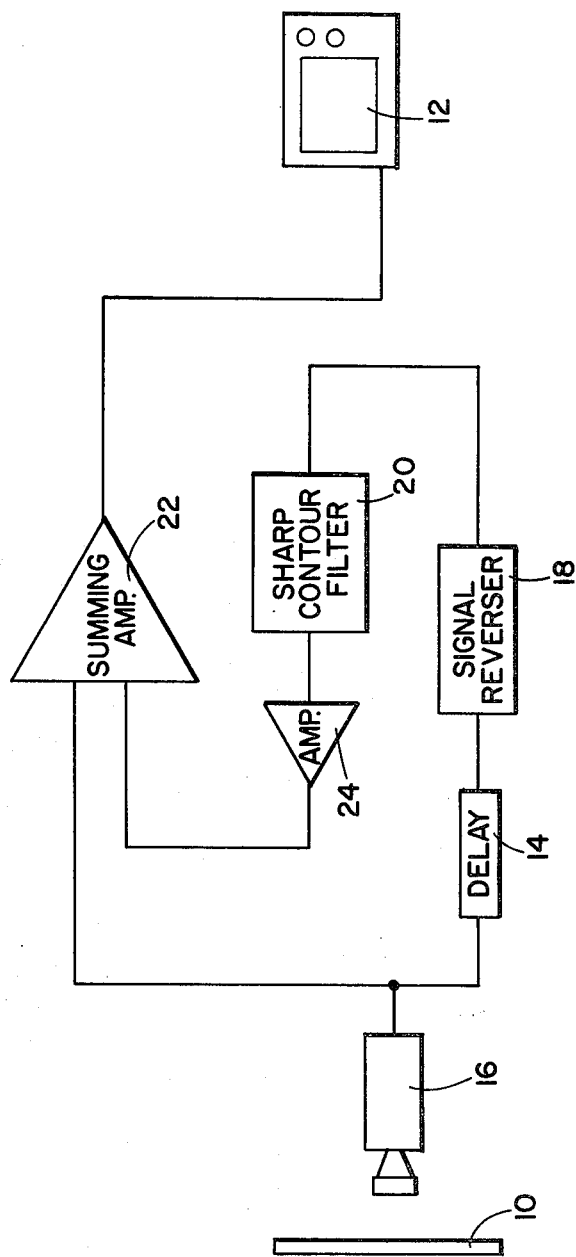

United States Patent [19]

Lemke

[11] 4,434,500
[45] Feb. 28, 1984

[54] PROCESS FOR STEREOSCOPIC PICTURE REPRODUCTION, IN PARTICULAR IN RESPECT OF X-RAY PICTURES

[75] Inventor: Norbert Lemke, Puchheim, Fed. Rep. of Germany

[73] Assignees: Paul Heitlinger, Nieder-Roden; Fritz Rodder, Waldems, both of Fed. Rep. of Germany

[21] Appl. No.: 323,228

[22] Filed: Nov. 20, 1981

[30] Foreign Application Priority Data

Jan. 12, 1980 [DE] Fed. Rep. of Germany ....... 3045172

[51] Int. Cl.$^3$ .................. A61B 6/00; G03B 41/16; H04N 5/22
[52] U.S. Cl. .................................. 378/99; 358/111
[58] Field of Search .................. 378/99, 41; 358/111

[56] References Cited

U.S. PATENT DOCUMENTS

1,356,442 10/1920 Garbutt .
3,535,443 7/1968 Rieke ................................. 378/99
4,058,832 11/1977 Vagi .

FOREIGN PATENT DOCUMENTS

2048851 10/1969 Fed. Rep. of Germany .

Primary Examiner—Alfred E. Smith
Assistant Examiner—T. N. Grigsby
Attorney, Agent, or Firm—Biebel, French & Nauman

[57] ABSTRACT

A process for stereoscopic picture reproduction on an electronic picture screen of a prerecorded picture, and in particular an X-ray picture, is provided for achieving detail enhancement. The pre-recorded picture is scanned to generate an identical pair of signals corresponding to each picture element, and the second signal of the pair is displaced relative the first. The second signal is then reversed and any portions of the signal corresponding to sharp contours in the original are filtered. The two signals are then recombined and the resulting signal is displayed on the electronic picture screen. The displayed picture is thereby given simulated shadowing for a stereoscopic effect resulting in detail enhancement.

2 Claims, 1 Drawing Figure

PROCESS FOR STEREOSCOPIC PICTURE REPRODUCTION, IN PARTICULAR IN RESPECT OF X-RAY PICTURES

For the purposes of interpreting X-ray films, doctors have hitherto used exclusively light boxes which have a white pane which is illuminated from the rear and which transmits light in a diffuse condition, with the X-ray film to be interpreted being laid on the front of the pane. In many cases, interpretation is difficult with such light boxes, particularly when the X-ray pictures suffer from poor contrast or are very bright, as arises when using the minimum possible amount of radiation, in order to protect the patient. In addition, it is not a simple manner for a doctor to explain a finding to a patient by means of X-ray pictures as such pictures do not give a lay person a three-dimensional picture, so that such a person has difficulty in envisaging which areas of the picture actually show cavities and which areas show prominent details.

For the purposes of improved interpretation, accessories for light boxes are already known, such as magnifying lenses for enlargement of a section or so-called contrast filters for darkening down bright X-ray films. However, magnifying lenses always produce distortion of the picture and detrimentally affect the contrast thereof, while so-called contrast filters, that is to say, tinted glass panes, which are laid over the X-ray film, only result in general darkening of the picture, without actually strengthening the degree of contrast between bright and dark.

The problem on which the present invention was based was that of providing a process for picture reproduction, in particular in respect of X-ray pictures, wherein the details are more prominent and thus facilitate diagnosis and in which the three-dimensional relationships of the details of an X-ray picture or another picture can be seen and followed by a lay person.

It was surprisingly found that it is possible for pictures or images such as in particular X-ray pictures to be stereoscopically reproduced on an electronic picture screen without the recorded picture being recorded stereoscopically or three-dimensionally, and to achieve a considerable improvement in picture resolution and detail discernment, by means of such a stereoscopic picture reproduction.

For the purposes of producing pictures or images with a stereoscopic effect, so-called stereo pictures, it was necessary hitherto to use special cameras for taking the pictures, such cameras producing two images or pictures which are displaced relative to each other with respect to the angle of viewing. The two pictures are then projected one upon the other by means of special reproduction equipment, thereby producing the stereo effect. It was however not possible hitherto to produce a stereo effect on reproducing a picture, with pictures which were recorded in a normal manner, such as normal X-ray films. This is attained for the first time by means of the process according to the invention.

In considering the invention, reference is made to FIG. 1, showing a schematic representation of apparatus for carrying out the disclosed process.

The process according to the invention, for stereoscopic picture reproduction, in particular in respect of an X-ray picture 10, on an electronic picture screen 12, is characterised in that two electrical picture signals which are displaced in time relative to each other by delay means 14 are produced from each picture element which is recorded by means of a television camera 16. One of the two picture signals is reversed by means 18 from positive to negative or from negative to positive, and those of the reversed picture signals which produce sharp contours in the picture are filtered out by means 20. The resulting picture signals are brought together again in their time-displaced mode by means 22, and the picture signals resulting from the superimposition of the combined picture signals are transformed on the picture screen 12 into picture elements.

Surprisingly, this process, when applied in respect of a normal picture or image which has a completely flat and nonthree-dimensional effect, produces a stereo reproduction which has a stereoscopic and three-dimensional effect and which shows stereoscopically and thus substantially more clearly, details which are hardly visible in the original picture or image. It is particularly surprising also that, in accordance with the process according to the invention, the reproduced picture is not for example made fuzy or blurred, but gains in sharpness and expressiveness by the three-dimensional effect produced, so that diagnosis is facilitated by using X-ray pictures which are reproduced in such a manner, and the patient can be considerably more easily informed and oriented when an X-ray picture which is reproduced in such a manner is explained to him.

As the process according to the invention is only concerned with the nature of reproduction of a normal picture such as an X-ray picture, without thereby the recording method having to be altered in comparison with the conventional method, there is no need to change anything on the X-ray recording equipment. Therefore, the X-ray picture recording equipment which is already available and which produces normal X-ray pictures can still be used as such normal X-ray pictures are converted in accordance with the invention into stereo pictures with a stereoscopic effect.

The process according to the invention is not only suitable for the stereoscopic reproduction of X-ray pictures, although that is the preferred area of use, but it is also suitable for such reproduction of optically produced pictures, that is to say, photographs, such as for example in testing material or the like.

In effect, in accordance with the process of the invention, by virtue of the time delay or displacement, two pictures are superimposed one upon the other, which however surprisingly does not result in blurring or the production of 'ghost images'. The reason for this is that the second picture which is superimposed on the original picture with a time delay is reversed in brightness values and filtered with respect to the contrast-forming parts, that is to say, with the process according to the invention, a positive picture is superimposed with a negative picture which is reproduced in a time-wise delayed mode, wherein only the shadows are retained in one of those two pictures, while the sharp contours are filtered out. Whether the filtered second picture or image is the negative or the positive one depends on whether the initial picture is positive or negative. If for example the initial picture is a negative X-ray picture, usually the second picture which is time-wise delayed is reversed to form a positive picture and the sharp contours are filtered out of that picture. A dark area in the original negative then has, due to the time-wise delayed superimposition with the corresponding bright area of the reversed picture, in comparison with the original picture, a darkened region at one edge and a brightened region at the other edge, giving the impression that this involves shadows as cast by a body or illuminated slanting surfaces, which produce the three-dimensional impression. This in turn surprisingly results in stronger image resolution in respect of details.

With this process, the degrees of contrast can be further enhanced by the shadow regions which are retained being strengthened in the reversed image from which the sharp contours were filtered out, by amplifying the appropriate picture signals by means 24.

Both the time displacement or delay in respect of the two superimposed pictures, and also the extent of filtering out of the picture signals producing sharp contours, and also the amplification of the remaining picture signals, can be steplessly controlled so that the degrees of contrast and the stereo effect can be altered and adjusted in particular cases, in order to provide optimum reproduction in respect of the particular picture in question.

The technical means for producing a time-wise shift in respect of picture reproduction, reversal of the picture signals, filtering out of the picture signals which produce sharp contours, and amplification of the remaining picture signals, are known per se to the man skilled in the art. Thus, the time delay effect can be produced for example by means of a delay line and the filtering effect can be produced by means of a capacitor. A surprising aspect in this connection is the effect which is produced by a combination of the claimed means, that is to say, the production of a three-dimensional impression of the picture, with considerably enhanced picture resolution.

The combination of time-wise displacement, reversal and filtering, which has been described hereinbefore, can be produced in one scanning direction of the television camera or in both scanning directions, although it is generally sufficient for such measures to be used on one scanning direction in order thereby to produce pictures which already have a fully stereoscopic effect.

Although in particular cases the delay in respect of the two pictures or picture signals which are to be superimposed on each other can be steplessly adjusted to optimise picture reproduction, it can generally be said that the time displacement can be to a suitable degree in order to produce the best stereoscopic impression.

There are many possible uses to which the process of the invention can be put, such as in the field of material testing, demonstrating medical findings by reference to optical photographs, but preferably in the field of X-ray pictures in which dark areas are experienced as cavities and bright areas are experienced as prominent details.

I claim:

1. A process for stereoscopic picture reproduction on an electronic picture screen of a pre-recorded picture, comprising the steps of:

scanning said pre-recorded picture with a television camera to generate an identical pair of electrical picture signals corresponding to each element of said picture;

displacing in time the second signal of said pair relative to the first signal of said pair;

reversing said second signal to cause said second signal to define a reversed image of the picture element to which said second signal originally corresponded;

filtering from said reversed second signal any portions thereof relating to sharp contours of said corresponding picture element;

combining substantially only said first signal and said reversed, filtered second signal; and transforming said combined signals into a picture element displayed on said electronic picture screen.

2. The process as defined in claim 1 wherein said reversed, filtered second signal is amplified prior to combination with said first signal.

* * * * *